(12) United States Patent
Augustin et al.

(10) Patent No.: US 11,870,751 B2
(45) Date of Patent: Jan. 9, 2024

(54) SMART SERVICE DISCOVERY TO INTERCONNECT CLUSTERS HAVING OVERLAPPING IP ADDRESS SPACE

(71) Applicant: Cisco Technology, Inc., San Jose, CA (US)

(72) Inventors: Aloys Christophe Augustin, Paris (FR); Mohammed Hawari, Montigny-le-bretonneux (FR); Nathan Roland Maryan Skrzypczak, Paris (FR); Jérôme Tollet, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/498,333

(22) Filed: Oct. 11, 2021

(65) Prior Publication Data

US 2023/0111266 A1   Apr. 13, 2023

(51) Int. Cl.
*H04L 61/4511* (2022.01)
*H04L 61/2592* (2022.01)
*H04L 12/46* (2006.01)
*H04L 61/5046* (2022.01)
*H04L 101/695* (2022.01)

(52) U.S. Cl.
CPC .......... *H04L 61/4511* (2022.05); *H04L 12/46* (2013.01); *H04L 61/2592* (2013.01); *H04L 61/5046* (2022.05); *H04L 2101/695* (2022.05)

(58) Field of Classification Search
None
See application file for complete search history.

(56) References Cited

U.S. PATENT DOCUMENTS

| | | |
|---|---|---|
| 2011/0026537 A1 | 2/2011 | Kolhi et al. |
| 2013/0219010 A1 | 8/2013 | Mahendran et al. |
| 2013/0339549 A1 | 12/2013 | Rangaraman et al. |
| 2015/0188949 A1 | 7/2015 | Mahaffey et al. |
| 2016/0308904 A1* | 10/2016 | Yoon ................... H04L 63/0272 |
| 2017/0070425 A1* | 3/2017 | Mithyantha ............. H04L 45/46 |
| 2018/0262461 A1 | 9/2018 | Chan et al. |
| 2020/0252335 A1* | 8/2020 | Kelam .................... H04L 45/46 |
| 2020/0351158 A1* | 11/2020 | Krivenok ............ H04L 12/4625 |
| 2020/0403911 A1* | 12/2020 | Singhal ................... H04L 45/34 |

FOREIGN PATENT DOCUMENTS

EP   1874005 A1 *   1/2008   ....... H04L 29/12009

* cited by examiner

*Primary Examiner* — Mohamed Ibrahim
(74) *Attorney, Agent, or Firm* — Edell, Shapiro & Finnan, LLC

(57) ABSTRACT

An approach to establish connections between clusters having overlapping IP address ranges. A method includes receiving, at a service discovery server, from a first node in a first cluster, a service discovery request including a unique name, determining, at the service discovery server, that the unique name resolves to a destination IP address of a second node in a second cluster, determining that the destination IP address overlaps with an IP address range associated with the first cluster, in response to determining that the destination IP address overlaps with the IP address range belonging to the first cluster, configuring a gateway to expect a network connection request from the first node that includes an IP address of the gateway, and sending a service discovery response to the first node, the service discovery response including the IP address of the gateway, but not the destination IP address.

18 Claims, 11 Drawing Sheets

G_A State

| SrcIP | SrcPort | DstIP | DstPort | Proto | Dest |
|---|---|---|---|---|---|
| | | | Established Flows | | |

| SrcIP | SrcPort | DstIP | DstPort | Proto | Dest |
|---|---|---|---|---|---|
| | | | Listeners | | |

FIG.2

G_A State

| SrcIP | SrcPort | DstIP | DstPort | Proto | Dest |
|---|---|---|---|---|---|
| | | | Established Flows | | |
| | | | | | |

| SrcIP | SrcPort | DstIP | DstPort | Proto | Dest |
|---|---|---|---|---|---|
| | | | Listeners | | |
| * | * | G_A1 | * | TCP | ClusterB / C_B (10.0.0.1) |

FIG.3

G_A State

| SrcIP | SrcPort | DstIP | DstPort | Proto | Dest |
|---|---|---|---|---|---|
| | | | Established Flows | | |
| C_A | P1 | G_A1 | PSrv | TCP | ClusterB / C_B |

| SrcIP | SrcPort | DstIP | DstPort | Proto | Dest |
|---|---|---|---|---|---|
| | | | Listeners | | |
| * | * | G_A1 | * | TCP | ClusterB / C_B |

FIG.4

G_A State

Established Flows

| SrcIP | SrcPort | DstIP | DstPort | Proto | Dest |
|---|---|---|---|---|---|
| C_A | P1 | G_A1 | PSrv | TCP | ClusterB / C_B |
| C_A2 | P2 | G_A2 | PSrv2 | TCP | ClusterB / C_B2 |

Listeners

| SrcIP | SrcPort | DstIP | DstPort | Proto | Dest |
|---|---|---|---|---|---|
| * | * | G_A1 | * | TCP | ClusterB / C_B |
| * | * | G_A2 | * | TCP | ClusterB / C_B2 |

FIG.5

G_A State

Established Flows

| SrcIP | SrcPort | DstIP | DstPort | Proto | Dest |
|---|---|---|---|---|---|
| C_A | P1 | G_A1 | PSrv | TCP | ClusterB / C_B |
| C_A2 | P2 | G_A2 | PSrv2 | TCP | ClusterB / C_B2 |
| C_A2 | P2* | G_A2 | PSrv2 | TCP | ClusterB / C_B2 |

Listeners

| SrcIP | SrcPort | DstIP | DstPort | Proto | Dest |
|---|---|---|---|---|---|
| * | * | G_A1 | * | TCP | ClusterB / C_B |
| * | * | G_A2 | * | TCP | ClusterB / C_B2 |

FIG.6

G_A State

Established Flows

| SrcIP | SrcPort | DstIP | DstPort | Proto | Dest |
|---|---|---|---|---|---|
| C_A | P1 | G_A1 | PSrv | TCP | ClusterB / C_B |
| C_A2 | P2 | G_A2 | PSrv2 | TCP | ClusterB / C_B2 |
| C_A2 | P2* | G_A2 | PSrv2 | TCP | ClusterB / C_B2 |
| C_A3 | P3 | G_A1 | PSrv2 | TCP | ClusterB / C_B2 |

Listeners

| SrcIP | SrcPort | DstIP | DstPort | Proto | Dest |
|---|---|---|---|---|---|
| * | * | G_A1 | * | TCP | ClusterB / C_B2 |

FIG.7

G_AState

| SrcIP | SrcPort | DstIP | DstPort | Proto | Dest |
|---|---|---|---|---|---|
| | | | Established Flows | | |
| C_A | P1 | G_A1 | PSrv | TCP | ClusterB / C_B |
| C_A2 | P2 | G_A1 | PSrv2 | TCP | ClusterB / C_B2 |

| SrcIP | SrcPort | DstIP | DstPort | Proto | Dest |
|---|---|---|---|---|---|
| | | | Listeners | | |
| C_A | * | G_A1 | * | TCP | ClusterB / C_B |
| C_A2 | * | G_A1 | * | TCP | ClusterB / C_B2 |

SMART SERVICE DISCOVERY TO INTERCONNECT CLUSTERS HAVING OVERLAPPING IP ADDRESS SPACE

TECHNICAL FIELD

The present disclosure relates to connectivity of networks having overlapping Internet Protocol (IP) address spaces.

BACKGROUND

Cloud computing clusters are increasingly provisioned by development and operations (DevOps) personnel with little regard for network addressing. That practice, combined with the limited amount of available private Internet Protocol version 4 (IPv4) addresses, generates a corresponding increase of the potential for overlapping address spaces used by different clusters. On the one hand, overlapping or shared address spaces across clusters is not a problem, as long as the communication is segregated and confined to individual clusters. On the other hand, it is often desirable to interconnect different clusters to leverage the services that they run. This interconnection inevitably causes issues with address range overlap. To avoid such issues, one might try to renumber (re-address) nodes in a given cluster to avoid any overlap, but this becomes tedious and inconvenient, especially with large-scale clusters. Moreover, renumbering may not even be possible if the available private IP addresses have already been exhausted.

BRIEF DESCRIPTION OF THE DRAWINGS

FIGS. 2-8 show the states of an Established flows table and a Listener table operated by at least one of the gateways, according to an example embodiment.

DESCRIPTION OF EXAMPLE EMBODIMENTS

Overview

Figure 1:
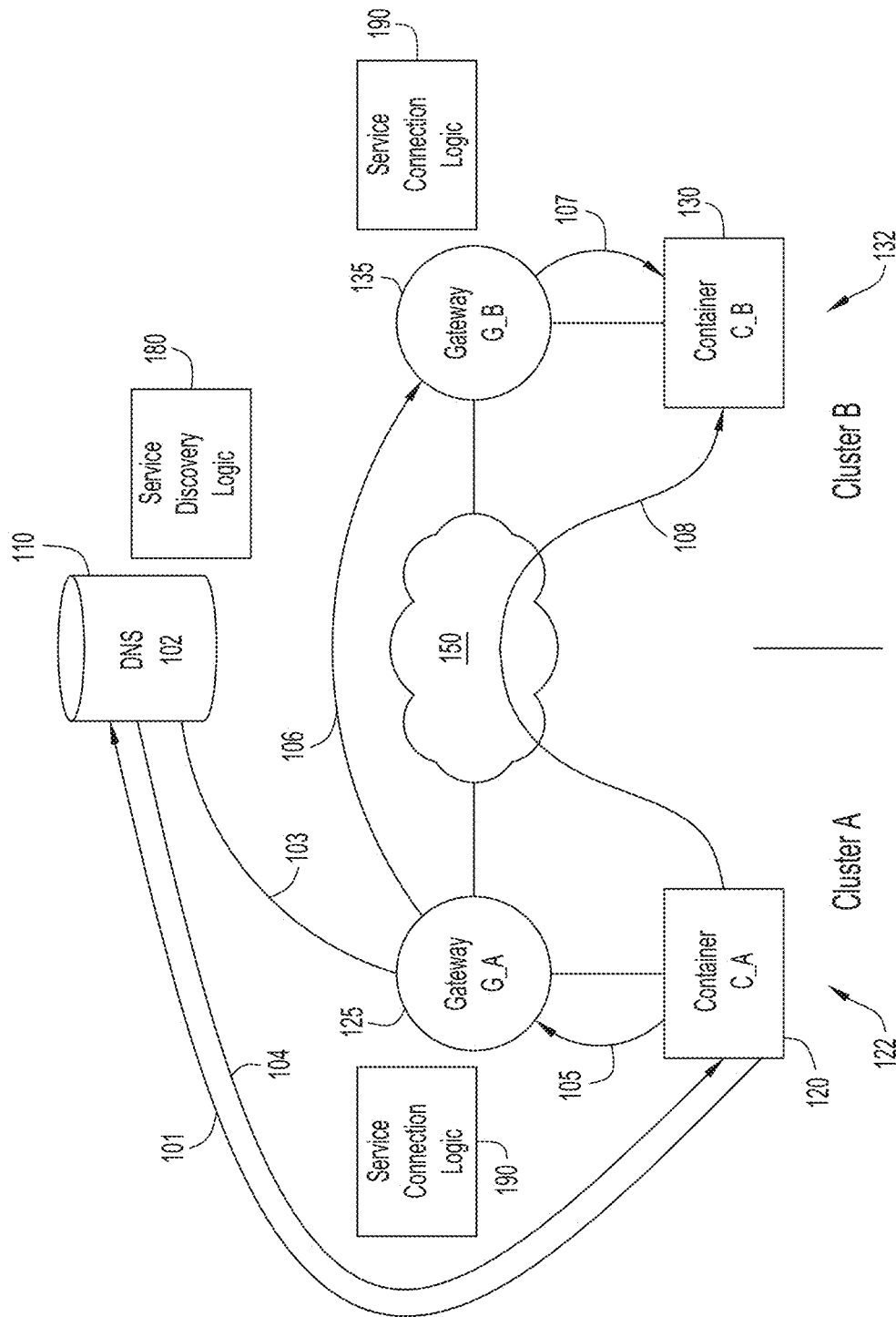
FIG. 1 is a system level diagram showing two clusters, respective gateways each hosting service connection logic, and a domain name system (DNS) server that hosts service discovery logic, according to an example embodiment.

Presented herein is an approach to establish connections between clusters having overlapping IP address ranges. A method includes receiving, at a service discovery server, from a first node in a first cluster, a service discovery request including a unique name, determining, at the service discovery server, that the unique name resolves to a destination IP address of a second node in a second cluster, determining that the destination IP address overlaps with an IP address range associated with the first cluster, in response to determining that the destination IP address overlaps with the IP address range belonging to the first cluster, configuring a gateway to expect a network connection request from the first node in the first cluster that includes an IP address of the gateway, and sending a service discovery response to the first node in the first cluster, the service discovery response including the IP address of the gateway, but not the destination IP address In another embodiment, another method includes receiving, from a service discovery server, at a gateway in a first cluster, a programming request, the programming request including a mapping between an IP address of the gateway that is expected to be received in a connection request from a first node in the first cluster, and a destination IP address corresponding to a second node in a second cluster, storing the mapping in the gateway in the first cluster, receiving the connection request from the first node in the first cluster, the connection request including the gateway IP address and a destination port number of the second node in the second cluster, and establishing a communication tunnel, via the gateway and based on the destination IP address and the destination port number, between the first node in the first cluster and the second node in the second cluster.

In still another embodiment a device is provided. The device includes an interface configured to enable network communications, a memory, and one or more processors coupled to the interface and the memory, and configured to: receive, from a service discovery server, at a gateway in a first cluster, a programming request, the programming request including a mapping between an IP address of the gateway that is expected to be received in a connection request from a first node in the first cluster, and a destination IP address corresponding to a second node in a second cluster, store the mapping in the gateway in the first cluster, receive the connection request from the first node in the first cluster, the connection request including the gateway IP address and a destination port number of the second node in the second cluster, and establish a communication tunnel, via the gateway and based on the destination IP address and the destination port number, between the first node in the first cluster and the second node in the second cluster.

Example Embodiments

Cloud and cloud native applications often rely on a service discovery mechanism (most often DNS) to connect to various services. This service discovery mechanism is leveraged, in accordance with an embodiment, to address a situation in which a first cluster may be trying to reach a second cluster, but the first and second clusters have overlapping address space, which introduces an uncertainty in accessing the intended far end or remote application, container, host, etc. As will be explained in detail below, novel service discovery logic is added to the service discovery mechanism (e.g., a DNS server) to modify its behavior in order to redirect connections or flows between networks, which have overlapping address space, to gateways that, in turn, using novel service connection logic, automatically forward the connection or flows to the intended destination (i.e., far end or remote application, container, host, etc.). The methodology is first explained in the context of two Kubernetes clusters with an overlapping IPv4 address plans. Then, the methodology is explained in a more generalized fashion. As those skilled in the art will come to appreciate, the described methodology may work for virtually any application protocol.

I. Interconnecting Two Kubernetes Clusters with Overlapping IP Address Space

FIG. 1 is a system level diagram showing two clusters, respective gateways each hosting service connection logic, and a domain name system (DNS) server that hosts service discovery logic, according to an example embodiment. More specifically, a DNS server 110 is in communication with a first cluster A 122 and a second cluster B 132 as well as a first gateway G_A 125 and a second gateway G_B 135. First cluster A 122 and second cluster B 132 may each host one or more containers, e.g., container C_A 120 and container C_B 130 consistent with, e.g., a Kubernetes configured network. Each such container may have an associated IP address by which the container can be accessed. For purposes of this discussion, communication will be described as between container C_A 120 and container C_B 130.

As will be explained, gateway G_A 125 may communicate with gateway G_B via network 150 (e.g., a public (Internet) or private network), thereby enabling communication between container C_A 120 and container C_B 130 via, e.g., network 150. Service discovery logic 180 is deployed on, or hosted by, DNS server 110 and service connection logic 190 is deployed on, or hosted by, each of first gateway G_A 125 and second gateway G_B 135. Service discovery logic 180 and service connection logic 190 provide software or instructions to execute the functionality described herein that enables container C_A 120 and container C_B 130 to communicate with one another even though the clusters in which they are in may have overlapping address space.

In this example, consider first container C_A 120 and second container C_B 130, each one using the 10.0.0.0/24 subnet. With the aforementioned duplicate subnet, disposing a simple L3 router between the first cluster A 122 and second cluster B 132 would not work because conflicting routes would be generated. To address this issue, first gateway G_A 125 and second gateway G_B 135 are introduced. As noted, first gateway G_A 125 and second gateway G_B 135 are interconnected by some means, such as via network 150. Considerations about gateway implementation and interconnection are described further below. DNS server 110 has an interface that is reachable from first container C_A 120 and second container C_B 130. For convenience, those network interfaces are named I_A and I_B.

Assume that container C_A 120, with address 10.0.0.1 and residing on first cluster A 122, wants to perform a TCP connection to container C_B 130 with address 10.0.0.1 and residing on second cluster B 132. It is assumed that the different containers are identified by a DNS name, unique across all clusters. With that assumption, and with reference to FIG. 1, an embodiment of the present methodology operates as follows.

Operation 101: Container C_A 120 resolves the name of container C_B 130 by making a DNS request to DNS server 110.

Operation 102: DNS server 110 receives the request on interface I_A, and knows that the name of container C_B 130 is associated with a node, container, host, etc. in second cluster B 132.

Operation 103: DNS server 110, executing service discovery logic 180, creates a state in gateway G_A 125, to instruct gateway G_A 125 to expect a connection from 10.0.0.1, and that this connection is, in fact, targeting container C_B 130.

Operation 104: DNS server 110, executing service discovery logic 180, returns the address of gateway G_A 125 to container C_A 120.

Operation 105: Container C_A 120 connects to gateway G_A 125.

Operation 106: Executing service connection logic 190, gateway G_A 125 checks the source address of the connection, and according to a state created by executing service discovery logic 180, knows that container C_A 120 is actually trying to reach container C_B 130, even though the address 10.0.0.1 is the same as an address in first cluster A 122. A full example of the states created in gateway G_A 125 by service discovery logic 180 and service connection logic 190 is provided further below in connection with FIGS. 2-8.

Operation 107: Gateway G_A 125 opens a connection to gateway G_B 135, using an appropriate protocol to instruct gateway G_B 135 to proxy the connection to container C_B 130 on the same port that container C_A 120 initially connected to.

Operation 108: Container C_A 120 and container C_B 130 are thereafter connected through gateway G_A 125 and gateway G_B 135, and via network 150, and can thus can exchange data.

In view of the foregoing methodology, even when two clusters have overlapping address space, as long as a commonly accessible DNS server with appropriate instructions loaded thereon (i.e., service discovery logic 180 that communicates with service connection logic 190 on an appropriate gateway), it is possible to set up a link between the two clusters (or containers therein) using gateways that operate as proxies for their clusters and/or containers.

II. General Mechanism

The example above used Kubernetes as an example where the service discovery mechanism is standardized to DNS. However, the instant methodology can be generalized to any service discovery method and network domain that has overlapping IP address space, as follows:

- Clients use a service discovery mechanism to connect to services (e.g., DNS)
- The service discovery mechanism is able to identify the network domain in which the requested service is running.
- A mechanism is in place to extend the service discovery mechanism to return the address of a gateway for services that are running in remote network domains.
- A mechanism is in place for workloads running in each network domain to reach a gateway, and for the gateways in each network domain to reach all the workloads in that domain.

Thus, with the foregoing in mind, the general mechanism for an embodiment of the methodology is executed as follows.

The client sends a service discovery request.

The service discovery mechanisms determines that the requested service endpoint is running in a remote network domain, and that proxy services, due to overlapping address space, can help avoid misrouting.

The service discovery mechanism chooses a local gateway, and informs the local gateway that a connection request may come from a given client, and that that connection should be directed to the targeted endpoint in the remote network domain. This mapping should remain in the gateway for as long as the response sent by the service discovery mechanism will be valid for the client (i.e., the time-to-live (TTL), if the service discovery mechanism is DNS).

The service discovery mechanism returns the gateway address (and optionally port, for instance with service (SRV) records in DNS) to the client.

The client connects to the gateway.

The gateway recognizes the connection, and takes care of forwarding it to the remote network domain through a remote gateway, passing along the destination.

The remote gateway receives the client connection, and forwards it to its destination.

The destination accepts the connection. The destination may reply to the source address that is in the received packets, which the gateways should have modified so that the replies are routed to the remote gateway.

The remote gateway forwards the reply back to the local gateway.

The local gateway forwards the reply back to the client, which ensures bidirectional communication with the target service endpoint or destination.

III. Implementing a DNS Server with Service Discovery Logic 180

The main responsibility of service discovery logic 180 is to allocate an address, and program that address into a gateway, e.g., gateway G_A 125. DNS server 110, with service discovery logic 180 executing thereon, should be located in the same address space for which the clients it is resolving.

Upon receiving a request from a client (e.g., container C_A 120) wanting to connect to a service (e.g., operated by container C_B 130), service discovery logic 180 chooses an address for the gateway G_A 125 located in the client's cluster. Service discovery logic 180 selects a two-tuple (client address, gateway address) that is unique for this gateway. The methodology according to an embodiment relies on the assumption that the client opens the connection with the same source address as it did when making the initial DNS request.

In the case where service discovery logic 180 has the knowledge of the pairs (protocol, port) exposed by a given service, service discovery logic 180 could reuse the same gateway address for a client making DNS requests for two different services given there is no overlap between the set of pairs (protocol, ports) both expose.

If the client is making a SRV request, service discovery logic 180 may be configured to allocate a port in addition to the address, thus reducing the number of different addresses needed. One could even drop the matching on the source address in this case and dedicate a tuple (protocol, address, port) to a client.

Service discovery logic 180 is further configured to be aware of the public address of the remote gateway, e.g., gateway G_B 135, behind which the service actually lives, and to which the traffic should be forwarded.

Once chosen, service discovery logic 180 is configured to program a state in, e.g., gateway G_A 125, configuring it to expect traffic from a given client address to the chosen address, and to forward it to, e.g., gateway G_B 135. Additionally, service discovery logic 180 provides the (protocol, port) mappings if they were taken into account.

With the foregoing approach, it should be enough to have as many addresses available for the gateways as the number of services that a single client is expected to connect to simultaneously. Taking service's pairs (protocol, port) into account may permit non-overlapping services to be considered as a single one, thus reducing the number of needed addresses.

IV. Implementing and Interconnecting Gateways Using Service Connection Logic 190

Following the response and programming from service discovery logic 180, service connection logic 190 matches the incoming flows on their two tuple (source & destination address). If the pairs (protocol, port) were also taken into account by service discovery logic 180, they may also be used for matching flows at this stage. Once a flow has been identified, and a forwarding decision is taken by service connection logic 190, the state can be persisted in a five tuple table (protocol, source & destination addresses, and ports).

Service connection logic 190 may also be configured to set a lifetime for entries programmed by service discovery logic 180 consistent with, e.g., DNS TTL, as it guarantees that the address will not be used for new connections after this delay. Persisted five tuples can be expired on TCP connection close or reset and/or after a timeout following common network address translation (NAT) gateway algorithms.

An appropriate protocol is selected for the gateway to gateway communication that carries an indication of the endpoint to which the tunneled flow should connect.

The selected protocol can include an encapsulation layer (e.g., IP in IP) and NATing on the ingress gateway. For instance, gateway G_A 125 could rewrite the destination address (10.0.0.1) and port and encapsulate the resulting packet before sending it to gateway G_B 135. Gateway G_B 135 would then decapsulate the packet, source NAT the inner with its own address and a well-chosen port, and forward it. This can also be done with transparent proxying, terminating the connection in gateway G_A 125, opening a new connection to gateway G_B 135 on which the first packet will carry the destination address and port. With the received metadata, gateway G_B 135 will then open a new connection, and forward traffic to the correct port on container C_B 130 (at, e.g., 10.0.0.1). One suitable protocol is HTTP with the CONNECT method.

It is noted that some care should be taken when choosing the source ports for outgoing traffic on the gateways, as they should not be able to collide with ports exposed by services on addresses that service discovery logic 180 will choose. This can be achieved by dedicating a port range that does not overlap with the port range on which services are listening—typically ephemeral ports above 49152—to allocate source port. It is also possible to reserve addresses dedicated for source network address translation (NAT), at the expense of address asymmetry in the event two services want to connect to each other on the same port.

FIGS. 2-8 show the states of an Established flows table and a Listener table operated by at least one of the gateways, and in particular by service connection logic 190, according to an example embodiment. The functionality of service connection logic 190 on gateway G_A 125 is described, but those skilled in the art will appreciate that service connection logic 190 on gateway G_B 135 may operate in a similar manner for containers in second cluster B 132.

Specifically, service connection logic 190 maintains two tables: an Established flows (or connection) table, which maps a 5-tuple to a remote service, and a Listeners table, which maps (1/2/3/4)-tuple to a remote service for new connections. See FIG. 2.

When a packet is received at gateway G_A 125, if it matches an entry in the Established flows table, it is forwarded to the recorded remote service. If it is a new connection (e.g., a TCP SYN packet) and matches an entry in the Listener table, a new entry is added to the Established flows table for its 5-tuple, and it is forwarded to the remote service. Flows in the Established flows table are expired using regular connection tracking algorithms.

Example Scenario 1—Single Container Seeking to Connect

The following example tracks the several enumerated operations depicted in, and described with respect to, FIG. 1. In this example, gateway G_A 125 is assigned two IP addresses G_A1, G_A2. Container C_A 120 wants to make a first connection to container C_B 130. At operation 101, container C_A 120 makes a DNS request to DNS server 110 effectively asking, e.g., what is the IP address of, e.g., serviceB.clusterB.internal.corp?

At operation 102, service discovery logic 180 determines that a gateway should be used since the service being requested is in a remote cluster with an overlapping IP range (in this case IP address 10.0.0.1 is associated with nodes in both first cluster A 122 and second cluster B 132).

At operation 103, service discovery logic 180 creates a listener state in gateway G_A 125. See FIG. 3, which indicates that when a connection is received to address G_A1 it is actually for second cluster B 132, and specifically its container C_B 130 accessible via IP address 10.0.0.1 (indicated in parentheses in FIG. 3, but not repeated in follow-on figures).

At operation 104, DNS server 110 returns a DNS reply to container C_A 120 indicating, in effect, that "serviceB.clusterB.internal.corp is reachable at G_A1."

At operation 105, container C_A 120 connects to G_A1. And at operation 106, as shown in FIG. 4, service connection logic 190 on gateway G_A 125 creates a tracking entry for this new connection in the Established flows table and forwards it to the remote cluster. The tracking entry includes SrcIP—C_A, SrcPort—P1, DstIP—G_A1, DstPort—Psrv, Protocol—TCP, and Dest—ClusterB/C_B.

Examiner Scenario 2—Second Container Seeking to Connect

In continuance of this example, another container C_A2 (not shown in FIG. 1) in first cluster A 122 wants to connect to still another container C_B2 (also not shown in FIG. 1) in second cluster B 132.

As such, at a follow-on operation 103, service discovery logic 180 creates a new listener state in gateway G_A 125, using the secondary IP address G_A2, and at operation 106, service connection logic 190 on gateway G_A 125 creates a tracking entry in the Established flows table for the new connection. See. FIG. 5

Example Scenario 3—Second Container Seeking to Connect to Second Remote Container In still another scenario, depicted by FIG. 6, container C_A2 in first cluster A 122 wants to open a second connection to container C_B2 in second cluster B 132. In such a case, service discovery logic 180 can reuse the existing listener entry, and at operation 106, service connection logic 190 on gateway G_A 125 creates a tracking entry for the new connection in the Established flows table. Only the source port is changed, indicated by "P2*", which would be another/different port on C_A2.

Refinement 1—Reuse Listeners for Different Clients

Given the operations described above, one gateway IP address may be required for every (container, destination) pair. This could prove to be very inefficient. To address this potential inefficiency, in one embodiment, if two clients (containers) need to connect to the same remote service, then the same listener can be reused for both.

Refinement 2—Expire Listener Entries after a Predetermined Amount of Time

In another embodiment, listener entries may expire after a predetermined amount of time. For example, DNS records have a built-in expiration time, namely TTL. After this TTL time has elapsed, clients will make a new DNS request before opening new connections. In the present methodology, the TTL value may be set to a relatively short period, e.g., five or ten seconds. After this time has elapsed, it is safe for service connection logic 190 on, e.g., gateway G_A 125 to delete a listener entry. If a client needs to open a new connection after that time, the client will make a new DNS request, which will recreate a listener entry.

Example Scenario 4—Listener Expiration

This example scenario starts from the state at the end of example scenario 3, and reference may be made to FIG. 7. After some time passes, both listener entries expire. Connections established in example scenarios 1, 2, and 3 are still open. A $3^{rd}$ client C_A3 (not shown in FIG. 1) wants to connect to C_B2. A new listener entry is created via operation 103. Notably, the address G_A1 can be reused by gateway G_A 125 for the new listener. The new connection is established using this address. Also notable is that this reuse of address G_A1 does not impact already-established connections. And note that in the Established flows table, address G_A1 is now used for connections that are forwarded to two different remote services.

Without expiration, three different gateway IP addresses would have been needed to support the desired connections. Expiration makes it possible to use only two such addresses.

Refinement 3—Make Listener Entries Source-IP Specific

In a system where clients have only one IP address, and if there is no NAT between the client, DNS server 110, and gateway G_A 120, then it is safe to assume that the source IP used by the client will also be used when connecting to the gateway. This is typically the case in a Kubernetes cluster. In such a case, DNS server 110, i.e., service discovery logic 180, can indicate to gateway G_A 120 that a listener entry should be used only for the source IP of the DNS request. This makes it possible to use one gateway address for different listeners (each bound to a client) that may redirect to different remote services.

Example Scenario 2 (Modified)—with Source-Address Specific Listeners

Reference is now made to FIG. 8, which shows the state of gateway G_A 120 after example scenario 2 above, with source-specific listeners, with changes are in bold. One listener would be created for each client, using the same gateway address but different destinations. Gateway G_A 120 looks at the source IP of incoming connections to know which listener to use. As can be seen in FIG. 8, only one IP address (GA_1) is used on gateway G_A 120 instead of two.

Refinement 2+3—Result

With expiring source-address specific listeners, the number of gateway IP addresses needed is the maximum number of different services a client is expected to connect to in a time span of the DNS TTL—a few dozen at most in practice, and likely fewer.

Refinement 4—Making Listener Entries Dst-Port Specific

In a similar fashion, if the destination port can be known in advance, the listeners can be made to only match a given destination port. There are two situations where this is possible. First, there is only one (or a few) ports exposed by the remote service, which are known by the DNS server/gateway. Second, the destination port to use is indicated to the client by DNS server 110 (e.g., with a SRV record). Note that this can also be the case if the service discovery mechanism used is not DNS, but something else that returns both an IP and a Port to the client, instead of only an IP address.

As with source-address specific listeners, this approach makes it possible to reduce the number of IP address required on the gateway. Note that listeners can generally not be source-port specific, since the source port for a connection is usually chosen randomly by the client.

Refinement 5—Combining Refinements

Those skilled in the art will appreciate that the several refinements described above may be used jointly to better optimize a given system, i.e., multi-cluster network with overlapping address space. For instance, if many clients are connecting to two or three remote services, each of them running on a different port, then three port-specific but source-address independent listeners using the same gateway IP address could be created and used by all clients. The type of listener to use could be dynamically optimized by a machine-learning algorithm, operating in, e.g., service discovery logic 180 and/or service connection logic 190. Note also that it is possible to make listeners less-specific at any time.

Resource Management

In the embodiments described above, functionality operating on DNS server 110 managed gateway G_A's 120 resources (address, port allocation for listeners). However, in another possible implementation, gateway G_A 120 could manage its own resources. For example, DNS server 110 could request a new listener (potentially for a specific source address, and/or destination port), and gateway G_A 120 would return the address (and optionally destination port) to use. If no more IP addresses are available on gateway G_A 120, DNS server 110 can return an error to the client, or gateway G_A 120 may request an additional IP address and use the same once allocated.

Extensions

Some protocols, such as FTP or SIP, transmit IP addresses and as such will are not compatible with the methodology described herein. However, application layer gateway (ALG) algorithms can be used on the gateways to ensure compatibility with these protocols.

The disclosed methodology effectively delegates the connectivity problem to a set of gateways, which can have specialized code to handle the cross cluster connectivity, enforce common security policies, and are present in a much smaller number than actual services. It allows applications in a given cluster to connect to services in a remote cluster, without changing the application code, even if the remote service is hosted in a cluster with an overlapping IP range.

Figure 9:
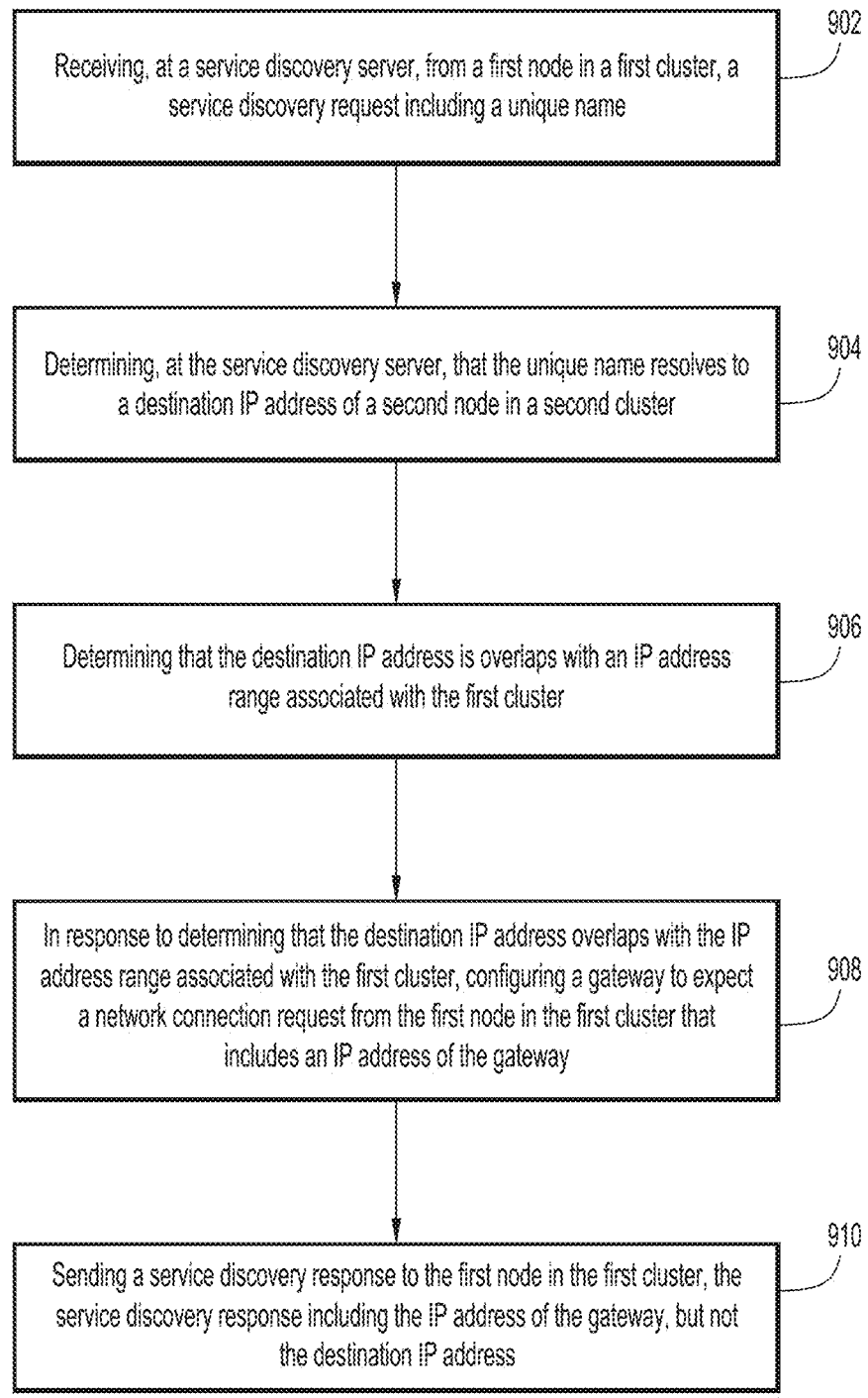
FIG. 9 is a flowchart showing a series of operations for establishing a connection between clusters having overlapping address space, according to an example embodiment.

By leveraging a common service discovery method, such as DNS, the methodology described herein connects services running on overlapping address ranges in different clusters. This works by modifying the service discovery mechanism to direct the connections to dedicated gateways, which are then responsible for setting up the cross cluster connectivity FIG. 9 is a flowchart showing a series of operations for establishing a connection between clusters having overlapping address space, according to an example embodiment. The following operations may be executed by, e.g., service discovery logic 180. At 902, an operation is configured to receive, at a service discovery server, from a first node in a first cluster, a service discovery request including a unique name. At 904, an operation is configured to determine, at the service discovery server, that the unique name resolves to a destination IP address of a second node in a second cluster. At 906, an operation is configured to determine that the destination IP address overlaps with an IP address range associated with the first cluster. At 908, an operation is configure to, in response to determining that the destination IP address overlaps with the IP address range belonging to the first cluster, configure a gateway to expect a network connection request from the first node in the first cluster that includes an IP address of the gateway. And, at 910, an operation is configured to send a service discovery response to the first node in the first cluster, the service discovery response including the IP address of the gateway, but not the destination IP address.

Figure 10:
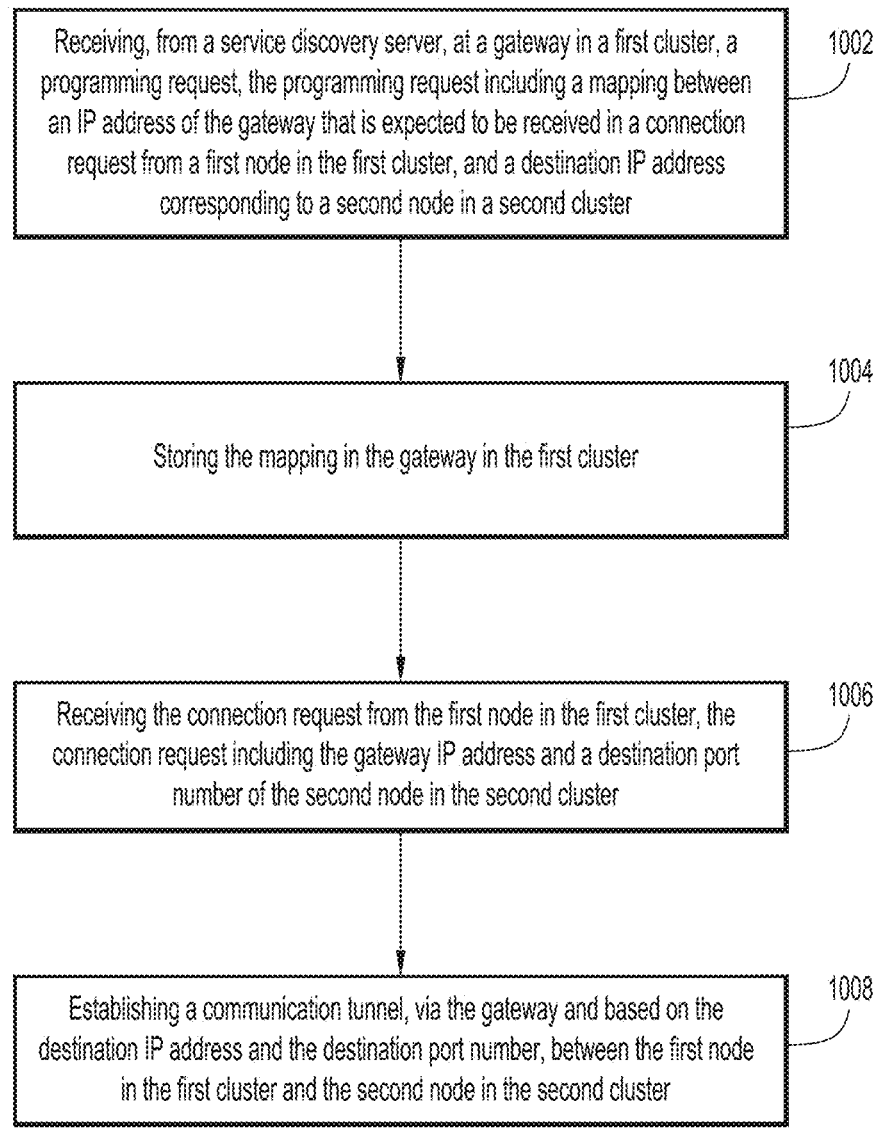
FIG. 10 is another flowchart showing a series of operations for establishing a connection between clusters having overlapping address space, according to an example embodiment.

FIG. 10 is another flowchart showing a series of operations for establishing a connection between clusters having overlapping address space, according to an example embodiment. The following operations may be executed by, e.g., service connection logic 190. At 1002, an operation is configured to receive, from a service discovery server, at a gateway in a first cluster, a programming request, the programming request including a mapping between an IP address of the gateway that is expected to be received in a connection request from a first node in the first cluster, and a destination IP address corresponding to a second node in a second cluster. At 1004, an operation is configured to store the mapping in the gateway in the first cluster. At 1006, an operation is configured to receive the connection request from the first node in the first cluster, the connection request including the gateway IP address and a destination port number of the second node in the second cluster. And, at 1008, an operation is configured to establish a communication tunnel, via the gateway and based on the destination IP address and the destination port number, between the first node in the first cluster and the second node in the second cluster.

Figure 11:
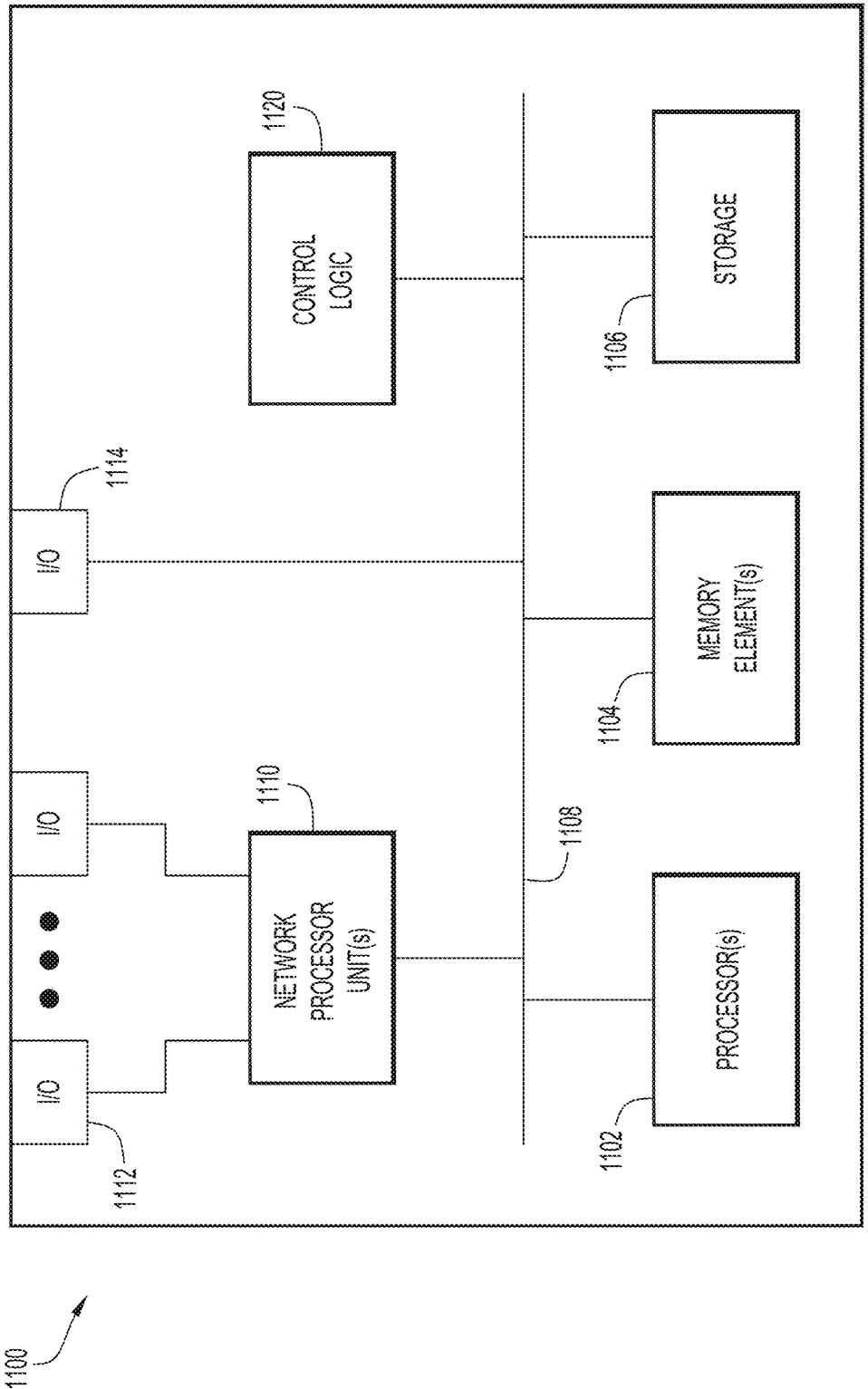
FIG. 11 illustrates a hardware block diagram of a computing device that may be configured to execute service discovery logic or service connection logic, according to an example embodiment.

FIG. 11 illustrates a hardware block diagram of a computing device that may be configured to execute service discovery logic 180 and/or service connection logic 190, according to an example embodiment.

In at least one embodiment, the computing device 1100 may include one or more processor(s) 1102, one or more memory element(s) 1104, storage 1106, a bus 1108, one or more network processor unit(s) 1110 interconnected with one or more network input/output (I/O) interface(s) 1112, one or more I/O interface(s) 1114, and control logic 1120. In various embodiments, instructions associated with logic for computing device 1100 can overlap in any manner and are not limited to the specific allocation of instructions and/or operations described herein.

In at least one embodiment, processor(s) 1102 is/are at least one hardware processor configured to execute various tasks, operations and/or functions for computing device 1100 as described herein according to software and/or instructions configured for computing device 1100. Processor(s) 1102 (e.g., a hardware processor) can execute any type of instructions associated with data to achieve the operations detailed herein. In one example, processor(s) 1102 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1104 and/or storage 1106 is/are configured to store data, information, software, and/or instructions associated with computing device 1100, and/or logic configured for memory element(s) 1104 and/or storage 1106. For example, any logic described herein (e.g., service discovery logic 180 or service connection logic 190) can, in various embodiments, be stored for computing device 1100 using any combination of memory element(s) 1104 and/or storage 1106. Note that in some embodiments, storage 1106 can be consolidated with memory element(s) 1104 (or vice versa), or can overlap/exist in any other suitable manner.

In at least one embodiment, bus 1108 can be configured as an interface that enables one or more elements of computing device 1100 to communicate in order to exchange information and/or data. Bus 1108 can be implemented with any architecture designed for passing control, data and/or information between processors, memory elements/storage, peripheral devices, and/or any other hardware and/or software components that may be configured for computing device 1100. In at least one embodiment, bus 1108 may be implemented as a fast kernel-hosted interconnect, potentially using shared memory between processes (e.g., logic), which can enable efficient communication paths between the processes.

In various embodiments, network processor unit(s) 1110 may enable communication between computing device 1100 and other systems, entities, etc., via network I/O interface(s) 1112 to facilitate operations discussed for various embodiments described herein. In various embodiments, network processor unit(s) 1110 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1100 and other systems, entities, etc. to facilitate operations for various embodiments described herein. In various embodiments, network I/O interface(s) 1112 can be configured as one or more Ethernet port(s), Fibre Channel ports, and/or any other I/O port(s) now known or hereafter developed. Thus, the network processor unit(s) 1110 and/or network I/O interface(s) 1112 may include suitable interfaces for receiving, transmitting, and/or otherwise communicating data and/or information in a network environment.

I/O interface(s) 1114 allow for input and output of data and/or information with other entities that may be connected to computing device 1100. For example, I/O interface(s) 1114 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1120 can include instructions that, when executed, cause processor(s) 1102 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., service discovery logic 180 or service connection logic 190) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 1104 and/or storage 1106 can store data, software, code, instructions (e.g., processor instructions), logic, parameters, combinations thereof, and/or the like used for operations described herein. This includes memory element(s) 1104 and/or storage 1106 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, a method is provided and includes receiving, at a service discovery server, from a first node in a first cluster, a service discovery request including a unique name, determining, at the service discovery server, that the unique name resolves to a destination IP address of a second node in a second cluster, determining that the destination IP address overlaps with an IP address range associated with the first cluster, in response to determining that the destination IP address overlaps with the IP address range belonging to the first cluster, configuring a gateway to expect a network connection request from the first node in the first cluster that includes an IP address of the gateway, and sending a service discovery response to the first node in the first cluster, the service discovery response including the IP address of the gateway, but not the destination IP address.

In an embodiment, configuring the gateway to expect the network connection request from the first node in the first cluster includes programming the gateway with the destination IP address.

In one possible scenario, the first node in the first cluster has a same IP address as the destination IP address.

In one possible implementation, the gateway is in the first cluster.

In another implementation, the service discovery server is a domain name service (DNS) server.

In another embodiment, another method includes receiving, from a service discovery server, at a gateway in a first cluster, a programming request, the programming request including a mapping between an IP address of the gateway that is expected to be received in a connection request from a first node in the first cluster, and a destination IP address corresponding to a second node in a second cluster, storing the mapping in the gateway in the first cluster, receiving the connection request from the first node in the first cluster, the connection request including the gateway IP address and a destination port number of the second node in the second cluster, and establishing a communication tunnel, via the gateway and based on the destination IP address and the destination port number, between the first node in the first cluster and the second node in the second cluster.

In one scenario, the destination IP address overlaps with a range of IP addresses belonging to the first cluster.

In an implementation, the method further includes establishing the communication tunnel via another gateway in the second cluster.

The method may also include receiving, from the service discovery server, at the gateway in the first cluster, another programming request, the another programming request including a mapping between another IP address of the gateway that is expected to be received in another connection request from the first node in the first cluster, and another destination IP address corresponding to a third node in the second cluster.

In an implementation, the method may also include deleting the mapping in the gateway in the first cluster after a predetermined period of time.

In one implementation, the predetermined period of time corresponds to a time-to-live (TTL) value associated with a domain name service (DNS) request.

In an implementation, the IP address of the gateway is used for multiple nodes in the first cluster, including the first node in the first cluster.

In the method, establishing the communication tunnel may include establishing the communication tunnel via a remote gateway in the second cluster.

In another embodiment, a device is provided. The device includes an interface configured to enable network communications, a memory, and one or more processors coupled to the interface unit and the memory, and configured to: receive, from a service discovery server, at a gateway in a first cluster, a programming request, the programming request including a mapping between an IP address of the gateway that is expected to be received in a connection request from a first node in the first cluster, and a destination IP address corresponding to a second node in a second cluster, store the mapping in the gateway in the first cluster, receive the connection request from the first node in the first cluster, the connection request including the gateway IP address and a destination port number of the second node in the second cluster, and establish a communication tunnel, via the gateway and based on the destination IP address and the destination port number, between the first node in the first cluster and the second node in the second cluster.

In one possible scenario, the destination IP address overlaps with a range of IP addresses belonging to the first cluster.

In an implementation, the one or more processors may be further configured to establish the communication tunnel via another gateway in the second cluster.

The one or more processors may be further configured to receive, from the service discovery server, at the gateway in the first cluster, another programming request, the another programming request including a mapping between another IP address of the gateway that is expected to be received in another connection request from the first node in the first cluster, and another destination IP address corresponding to a third node in the second cluster.

The one or more processors may be further configured to delete the mapping in the gateway in the first cluster after a predetermined period of time.

In an implementation, the predetermined period of time may correspond to a time-to-live (TTL) value associated with a domain name service (DNS) request.

The one or more processors may be further configured to establish the communication tunnel by establishing the communication tunnel via a remote gateway in the second cluster.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
  receiving, at a service discovery server, from a first node in a first cluster, a service discovery request including a unique name;
  determining, at the service discovery server, that the unique name resolves to a destination IP address of a second node in a second cluster;

determining that the destination IP address overlaps with an IP address range associated with the first cluster;

in response to determining that the destination IP address overlaps with the IP address range belonging to the first cluster, configuring a gateway to expect a network connection request from the first node in the first cluster that includes an IP address of the gateway and to treat the network connection request as a request directed to the destination IP address; and sending a service discovery response to the first node in the first cluster, the service discovery response including the IP address of the gateway, but not the destination IP address, wherein the gateway is accessible, simultaneously, by way of another IP address, which is provided to another node in the first cluster, in response to a request to the service discovery server from the another node in the first cluster to reach a third node in the second cluster.

2. The method of claim 1, wherein configuring the gateway to expect the network connection request from the first node in the first cluster comprises programming the gateway with the destination IP address.

3. The method of claim 1, wherein the first node in the first cluster has a same IP address as the destination IP address.

4. The method of claim 1, wherein the gateway is in the first cluster.

5. The method of claim 1, wherein the service discovery server is a domain name service (DNS) server.

6. A method comprising:

receiving, from a service discovery server, at a gateway in a first cluster, a programming request, the programming request including a mapping between an IP address of the gateway that is expected to be received in a connection request from a first node in the first cluster, and a destination IP address corresponding to a second node in a second cluster, wherein the programming request is in response to a service discovery request from the first node in the first cluster;

storing the mapping in the gateway in the first cluster;

receiving the connection request from the first node in the first cluster, the connection request including the IP address of the gateway and a destination port number of the second node in the second cluster; and establishing a communication tunnel, via the gateway and based on the destination IP address and the destination port number, between the first node in the first cluster and the second node in the second cluster, wherein the gateway is accessible, simultaneously, by way of another IP address, which is provided to another node in the first cluster, in response to a request to the service discovery server from the another node in the first cluster, to reach a third node in the second cluster.

7. The method of claim 6, further comprising deleting the mapping in the gateway in the first cluster after a predetermined period of time.

8. The method of claim 7, wherein the predetermined period of time corresponds to a time-to-live (TTL) value associated with a domain name service (DNS) request.

9. The method of claim 6, wherein the destination IP address overlaps with a range of IP addresses belonging to the first cluster.

10. The method of claim 6, further comprising establishing the communication tunnel via another gateway in the second cluster.

11. The method of claim 6, wherein the IP address of the gateway is used for multiple nodes in the first cluster, including the first node in the first cluster.

12. The method of claim 6, wherein establishing the communication tunnel comprises establishing the communication tunnel via a remote gateway in the second cluster.

13. A device comprising:

an interface configured to enable network communications;

a memory; and one or more processors coupled to the interface and the memory, and configured to:

receive, from a service discovery server, at a gateway in a first cluster, a programming request, the programming request including a mapping between an IP address of the gateway that is expected to be received in a connection request from a first node in the first cluster, and a destination IP address corresponding to a second node in a second cluster, wherein the programming request is in response to a service discovery request from the first node in the first cluster;

store the mapping in the gateway in the first cluster;

receive the connection request from the first node in the first cluster, the connection request including the IP address of the gateway and a destination port number of the second node in the second cluster; and establish a communication tunnel, via the gateway and based on the destination IP address and the destination port number, between the first node in the first cluster and the second node in the second cluster, wherein the gateway is accessible, simultaneously, by way of another IP address, which is provided to another node in the first cluster, in response to a request to the service discovery server from the another node in the first cluster, to reach a third node in the second cluster.

14. The device of claim 13, wherein the one or more processors are further configured to delete the mapping in the gateway in the first cluster after a predetermined period of time.

15. The device of claim 14, wherein the predetermined period of time corresponds to a time-to-live (TTL) value associated with a domain name service (DNS) request.

16. The device of claim 13, wherein the destination IP address overlaps with a range of IP addresses belonging to the first cluster.

17. The device of claim 13, wherein the one or more processors are further configured to establish the communication tunnel via another gateway in the second cluster.

18. The device of claim 13, wherein the one or more processors are further configured to establish the communication tunnel by establishing the communication tunnel via a remote gateway in the second cluster.

* * * * *